(12) United States Patent
Gau et al.

(10) Patent No.: US 8,097,359 B2
(45) Date of Patent: Jan. 17, 2012

(54) RAPID EXCHANGE BATTERY CONSTRUCTION

(75) Inventors: Tien-Ho Gau, Hsinchu (TW); Yu-Yin Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 486 days.

(21) Appl. No.: 12/350,310

(22) Filed: Jan. 8, 2009

(65) Prior Publication Data

US 2010/0136425 A1 Jun. 3, 2010

(30) Foreign Application Priority Data

Dec. 3, 2008 (TW) .............................. 97147022 A (51) Int. Cl.
*H01M 2/10* (2006.01)
(52) U.S. Cl. ........................................ 429/187; 429/100
(58) Field of Classification Search ............ 429/96–100, 429/187
See application file for complete search history.

(56) References Cited

U.S. PATENT DOCUMENTS

| 4,756,978 | A | * | 7/1988 | Nitcher et al. ................ 429/1 |
| 5,366,827 | A | * | 11/1994 | Belanger et al. ............... 429/99 |
| 5,633,095 | A | * | 5/1997 | Ishikawa et al. ............... 429/1 |
| 5,863,218 | A | * | 1/1999 | Quat et al. ..................... 439/500 |
| 2008/0268330 | A1 | * | 10/2008 | Hansen et al. ................. 429/97 |

FOREIGN PATENT DOCUMENTS

| TW | M312485 | 10/1995 |
| TW | M331761 | 10/1996 |

* cited by examiner

*Primary Examiner* — Gregg Cantelmo
(74) *Attorney, Agent, or Firm* — Stevens & Showalter LLP (57) ABSTRACT

A rapid exchange battery construction is applied in a battery module of an electric device to supply power. The battery module is pivoted with a rotatable handle, a catching member is disposed on the handle, and a fixing structure is erected on a base of a battery assembly structure. A pressing portion and a releasing opening are disposed at a top edge of the fixing structure. The handle is rotated to a gripping position for lifting the battery module to install the battery module on the base along the fixing structure, and then, the handle is rotated to a withdrawal position to move the catching member to the pressing portion. The battery structure is designed in such a manner that the battery module is secured and fixed on the base, and an electrical connection relationship between the battery module and the electric device is ensured.

13 Claims, 13 Drawing Sheets

RAPID EXCHANGE BATTERY CONSTRUCTION

CROSS-REFERENCE TO RELATED APPLICATIONS

This non-provisional application claims priority under 35 U.S.C. §119(a) on Patent Application No(s). 097147022 filed in Taiwan, R.O.C. on Dec. 3, 2008 the entire contents of which are hereby incorporated by reference.

BACKGROUND OF THE INVENTION

1. Field of Invention

The present invention relates to a battery module construction, and more particularly to an exchange battery construction capable of being disassembled and assembled rapidly.

2. Related Art

Environment protection is a very important topic in the human society, and the exhaust emission of traditional oil-fired vehicles is the largest mobile pollution source, while the exhaust pollution would be efficiently reduced by employing a hybrid electric vehicle or an electric vehicle, such as an electric motorcycle or an electric bicycle.

The electric vehicle supplies power completely through a battery, which is a very important key component. In order to maintain a cruising endurance of the electric vehicle, a related charging facility must be built, such that the battery can be charged when its power is on the point of being used up. However, a charging time of the battery is longer than a refueling time of a traditional automobile. If a service mode for battery interchange can be provided to save the charging time, it would be much easier for the people to accept the electric vehicle.

To achieve the service mode for battery interchange of the electric vehicle, a battery module thereof must employ a detachable design for a convenient and rapid replacement. For example, a battery box automatic locking device is disclosed in the Taiwan patent publication No. M331761, in which an elastic fixing element is designed in an accommodation space for installing the battery box, and the elastic fixing element may buckle the battery box. Also, a battery clamping device of a carriage is disclosed in the Taiwan patent publication No. M312485, in which a catcher and a trigger are disposed on the carriage, the catcher is used to fasten the battery box, and the trigger is used to drive the catcher to provide a buckling force of the catcher. The battery is fixed on the electric vehicle via a fixing mechanism such as the elastic fixing element or the catcher, and may be taken out by releasing a constraint of the fixing mechanism, thereby achieving a purpose of replacing the battery.

In addition to the battery fixing mechanism, an electrode terminal is disposed at a corresponding battery assembling position on the electric vehicle, and since the battery is assembled on the electric vehicle, an electrode on the battery must be electrically connected to the electrode terminal. As described in the above patent publication No. M331761, the battery fixing mechanism is designed to employ the elastic fixing element, such that it is simple in structure, but may be easily unclamped due to vibration in the travel, causing the electrode of the battery to be separated from the electrode terminal of the electric vehicle to generate an electric arc effect or a resistance effect, thereby incurring a fire ignition due to a high temperature. Also, in the clamping device as employed in the above patent publication No. M312485, the catcher is driven by the trigger for providing a tight clamping relationship, so as to prevent the electrode of the battery from being separated from the electrode terminal of the electric vehicle. However, the clamping device is complicated in the structural composition, and adds actions for assembling and separating, so the purpose of rapidly replacing the battery cannot be achieved.

SUMMARY OF THE INVENTION

The conventional battery fixing mechanism may be disassembled and assembled rapidly by employing a simple structure design, but a separation tends to occur in an unexpected case. When employing a complicated structural design, an electrical connection relationship of the electrodes may be ensured, but a complicated structure increases the production cost, and a speed for replacing the battery would be influenced by an uneasy disassembly and assembly, causing a technical conflict occurring in the rapid assembly and the electrical connection relationship. Therefore, the conventional battery fixing structure is not the optimum design. In viewing of this, the present invention provides a rapid exchange battery construction.

According to the rapid exchange battery construction disclosed by the present invention, a battery module is assembled on a base, in which the battery module has a plurality of electrodes, and a rotatable handle is pivoted on the battery. The handle may be rotated to a gripping position for a user to grip for lifting the battery module, and a withdrawal position close to the battery. A catching member is disposed adjacently to a pivot axis center of the handle. A plurality of electrode terminals are provided on the base, and a pair of fixing structures spaced apart by a distance are erected on the base. A pressing portion and a releasing opening are disposed at a top edge of the fixing structure, for rotating the handle to the gripping position to lift the battery module, such that the battery module is installed on the base along the fixing structure. The catching member on the handle passes through the releasing opening of the fixing structure, and the electrode of the battery module forms an electrical connection with the electrode terminal of the base. Then, the handle is rotated to the withdrawal position, and the catching member is moved to press against the pressing portion, such that the battery module is fixed on the base, and is ensured to have a steady electrical connection relationship.

According to the rapid exchange battery construction disclosed by the present invention, it is a design of integrating the handle and the fixing mechanism, in which the handle may aid in lifting and moving the battery to facilitate the disassembling and assembling actions, while a tight assembly relationship may be provided as the handle is withdrawn. In a process of replacing and fixing the battery module, the fixing and the electrical connection with the battery module are accomplished at the same time. The assembly is easy and rapid, and the electrical connection relationship with the battery module is ensured, so it is an optimum design applied in the electric device.

The detailed futures and practice about the present invention are illustrated in detail in the detailed description in conjunction with the drawings. The content thereof is sufficient for any skilled in the art to understand and implement the technical content of the present invention, and in accordance with the content and drawings disclosed by this specification, any skilled in the art may easily understand the related purposes and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A rapid exchange battery construction disclosed according to the present invention is applied on an electric device with a battery for supplying an operational power. The electric device refers to an electric vehicle such as an electric mobile, an electric motorcycle, and an electric bicycle, or a hybrid electric vehicle such as a hybrid electric automobile, or other medium-and-large-sized electric facilities. The battery may be a lead-acid battery, a nickel-hydrogen battery, a lithium-ion battery, and other secondary battery that may be charged and discharged repeatedly, and may also be a fuel cell battery. The electric mobile is taken as an example in the following embodiments, and of course, the application and scope of the present invention are not limited by the following embodiments.

Figure 1:
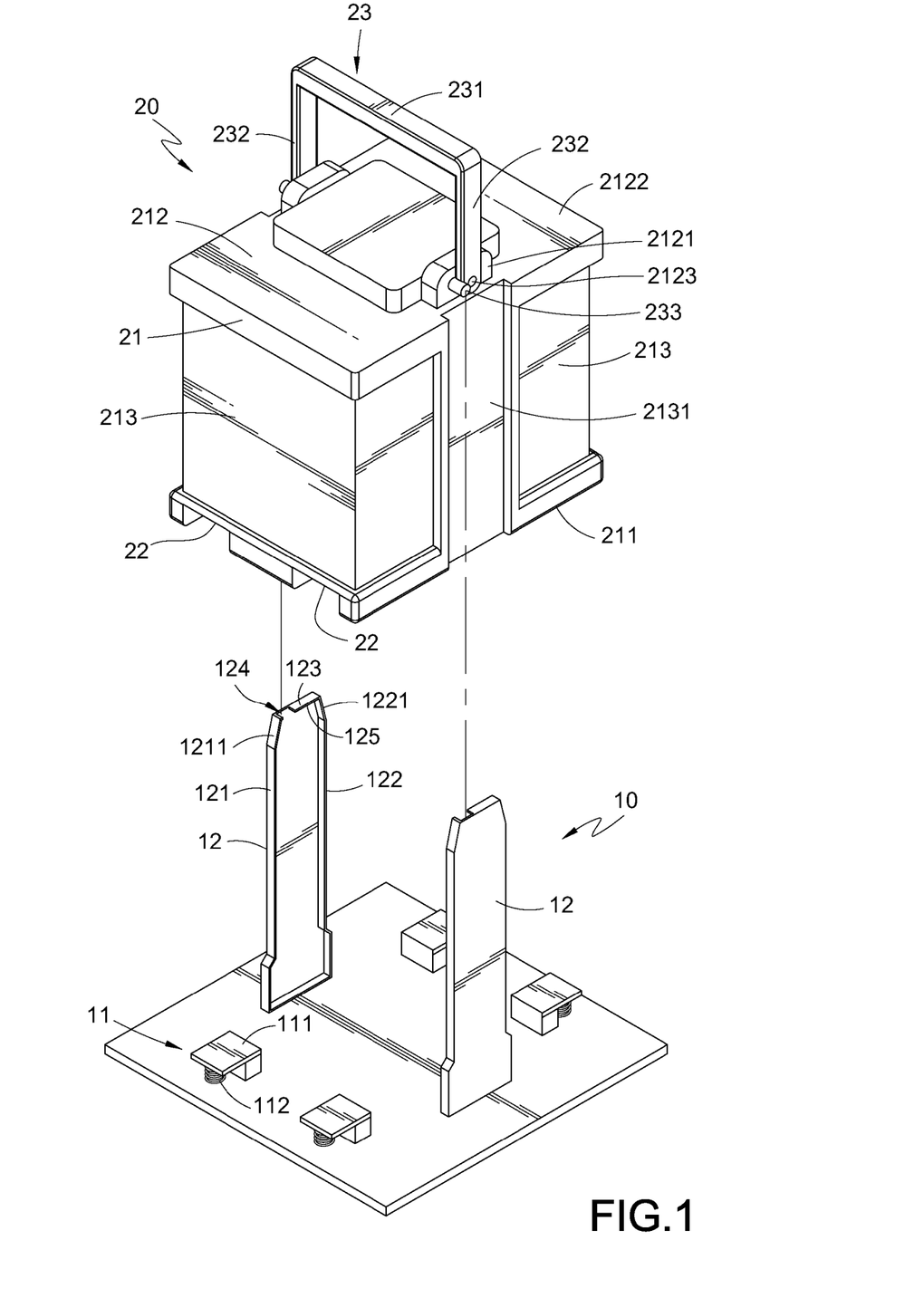
FIG. 1 is an exploded structural view of a first embodiment of the present invention.

Referring to FIG. 1, a first embodiment of the present invention is shown. In the rapid exchange battery construction disclosed according to the present invention, a battery assembly structure includes a base 10 and a battery module 20.

Figure 2:
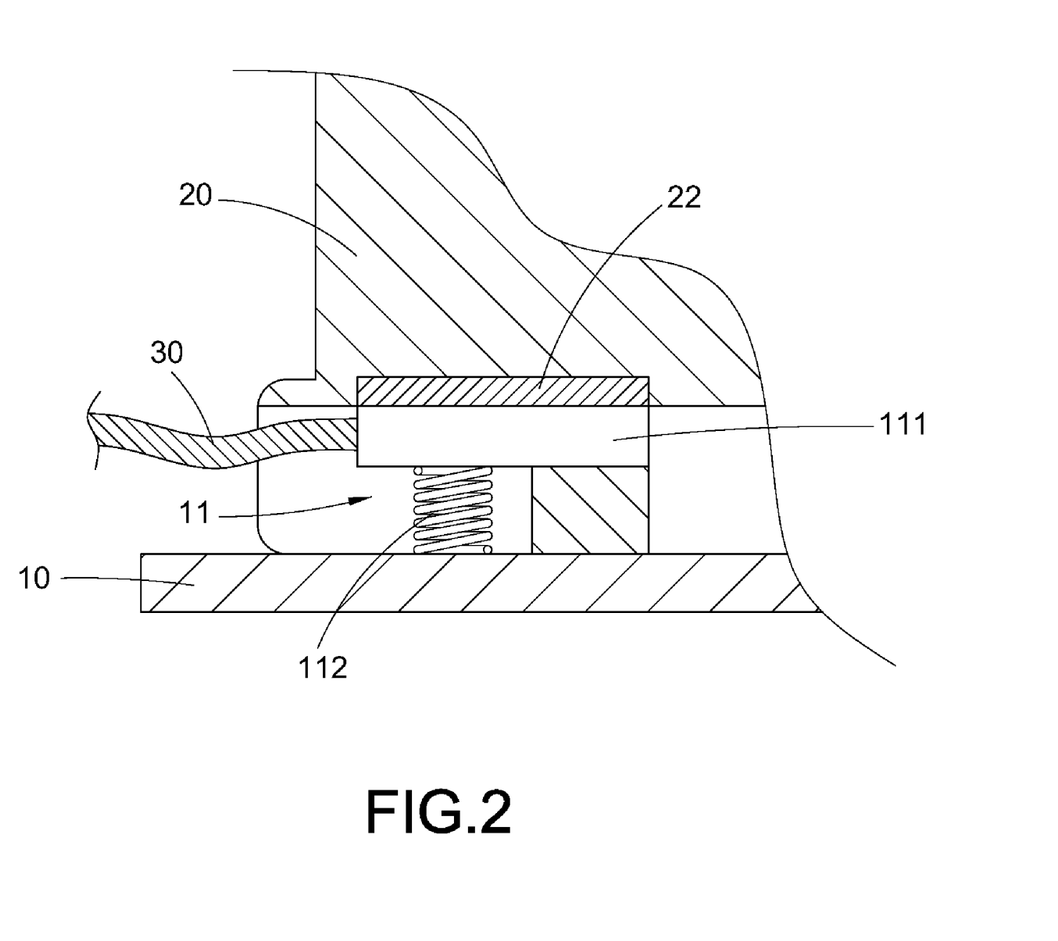
FIG. 2 is a schematic view of a combination part of a battery module and a base according to the first embodiment of the present invention.

The base 10 is disposed in a battery reception space (not shown) of the electric motorcycle, and a plurality of electrode terminals 11 is provided on the base 10. Referring to FIG. 2 in combination, a motor of the electric motorcycle is electronically connected to the electrode terminals 11 via a lead 30. The electrode terminal 11 includes a conducting strip 111 and an elastic element 112 disposed under the conducting strip 111. The elastic element 112 may be a spring or an elastic rubber, so as to provide an elastic force for compressing or resetting the conducting strip 111.

A pair of fixing structures 12 (columns as shown) are erected on the base 10, and the two fixing structures 12 are spaced apart by a distance to constitute a range for accommodating the battery module 20. The fixing structure 12 includes two side walls 121, 122 and a top wall 123 at the top of the side walls 121, 122. Guiding faces 1211, 1221 with a relative inclination angle are disposed at an adjacency of the side walls 121, 122 and the top wall 123, such that a top edge of the fixing structure 12 assumes a convergent shape. The side walls 121, 122 and the top wall 123 are such that the inner side of the fixing structure 12 forms an open space. The top wall 123 extends from the side wall 121, but is not joined to the side wall 122, such that there is an interval between the top wall 123 and the side wall 122 to form a releasing opening 124 in communication with the open space of the fixing structure 12. Furthermore, an inner surface of the top wall 123 is defined as a pressing portion 125. In this embodiment, the two fixing structures 12 have the same structure design, but in a specific implementation, the releasing opening 124 and the pressing portion 125 may be set at one fixing structure 12.

The battery module 20 includes a battery housing 21, in which the battery module 20 is composed of chemical compositions that generate power through a reaction (it is a known technology, and will not be repeated herein). The battery housing 21 substantially assumes a cube with a bottom face 211, a top face 212, and four side faces 213. A plurality of electrodes 22 is provided at the bottom face 211, and the number and position of the electrodes 22 correspond to the number and position of the electrode terminals 11 on the base 10. A guiding slot 2131 is disposed on at least two opposing side faces 213 of the battery housing 21, and a width of the guiding slot 2131 matches the width of the fixing structure 12.

Figure 3A:
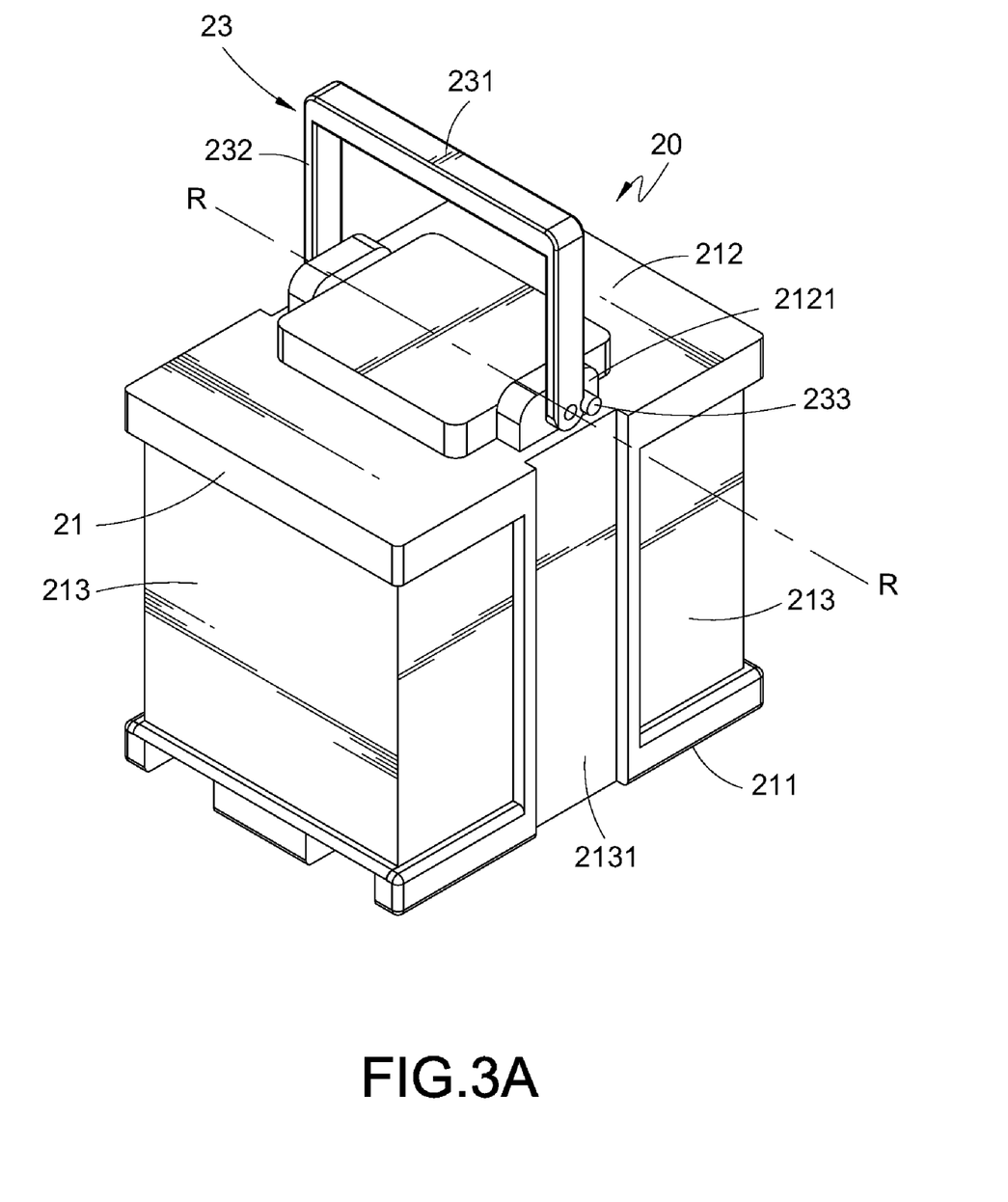
FIGS. 3A, 3B, 3C, 3D, 3E, and 3F are schematic views of handle actions of the battery module according to the first embodiment of the present invention.
Figure 3B:
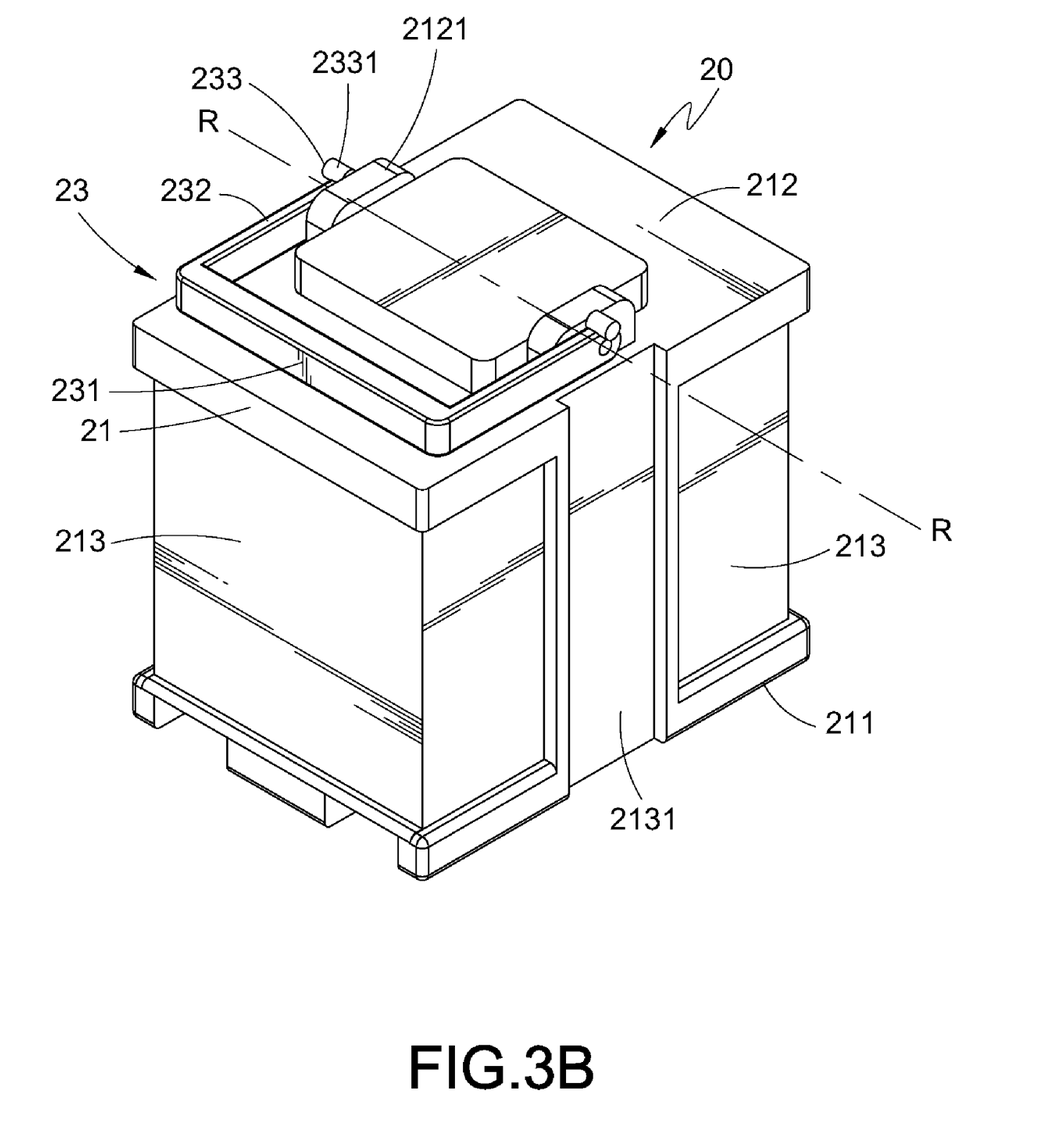
Figure 3C:
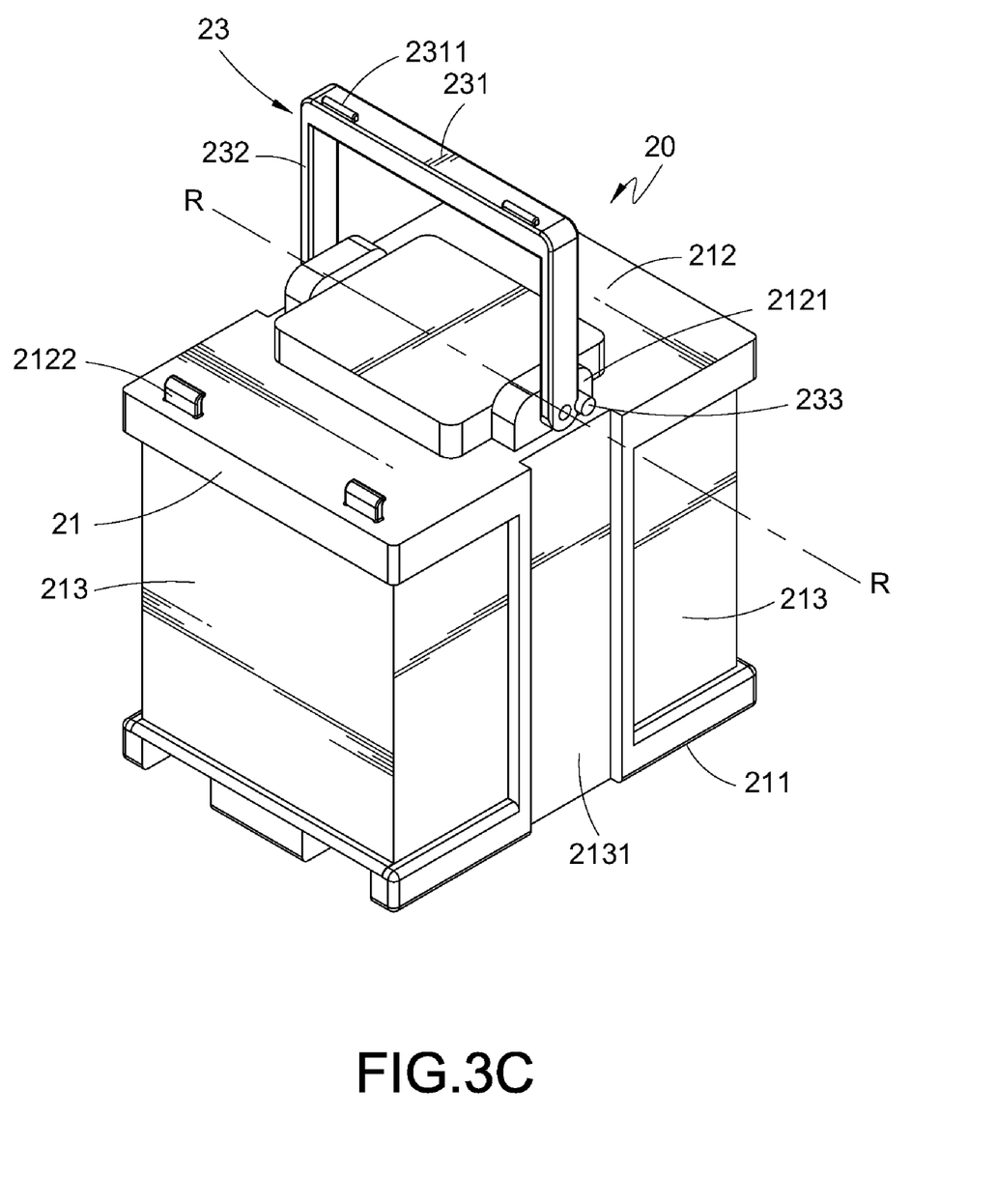
Figure 3D:
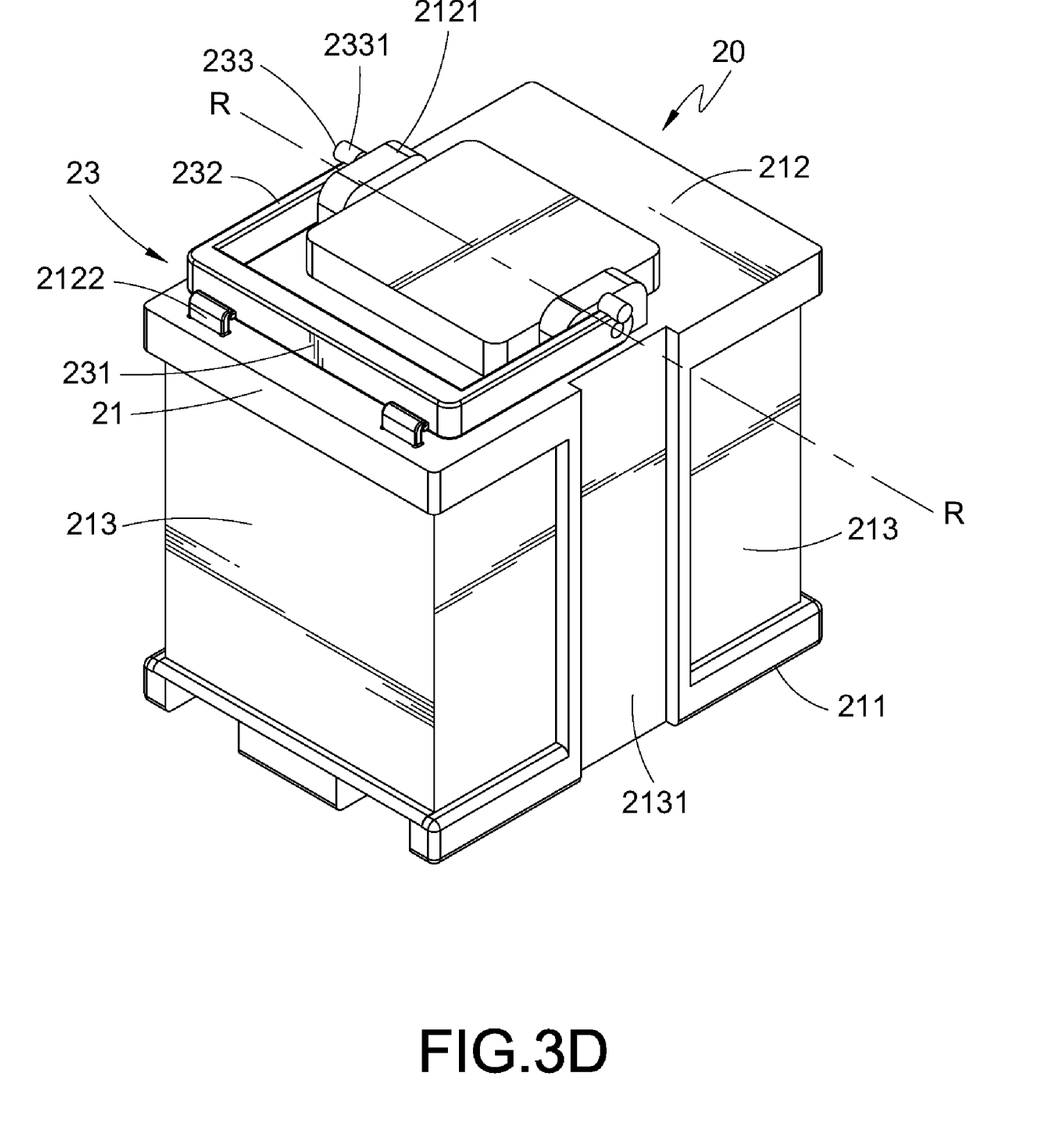

Referring to FIGS. 3A and 3B in combination, two pivot bases 2121 are disposed at the positions corresponding to the guiding slots 2131 at the top face 212 of the battery housing 21, and a handle 23 is pivoted via a pivot 2123 on the two pivot bases 2121. The handle 23 is of a U-shape made up of a lifting rod 231 and two pivot rods 232. The handle 23 is rotated with respect to the top face 212 with the pivot bases 2121 as an axis center, such that the handle 23 has a gripping position of being erected on the top face 212 and a withdrawal position of being pressed close to the top face 212. In the gripping position, the handle 23 may be used for the user to grip the lifting rod 231 for lifting the battery module 20. In the withdrawal position, the handle 23 is pressed close to the battery housing 21 for installing the battery module 20 in the battery reception space of the electric mobile. Further, as shown in FIGS. 3C and 3D, a clamping block 2311 is disposed at an end edge of the lifting rod 231, while a stopping block 2122 is disposed at the top face 212 in correspondence to the clamping block 2311 of the lifting rod 231. As the handle 23 is moved to the withdrawal position, the clamping block 2311 is engaged with the stopping block 2122 to form an interference constraint, such that the handle 23 is fixed on the top face 212. When it intends to rotate the handle 23 from the withdrawal position to the gripping position, a force must be applied to overcome the engagement of the stopping block 2122 and the clamping block 2311 to rotate the handle 23, such that the handle 23 may resist an unexpected external force in the withdrawal position.

Figure 3E:
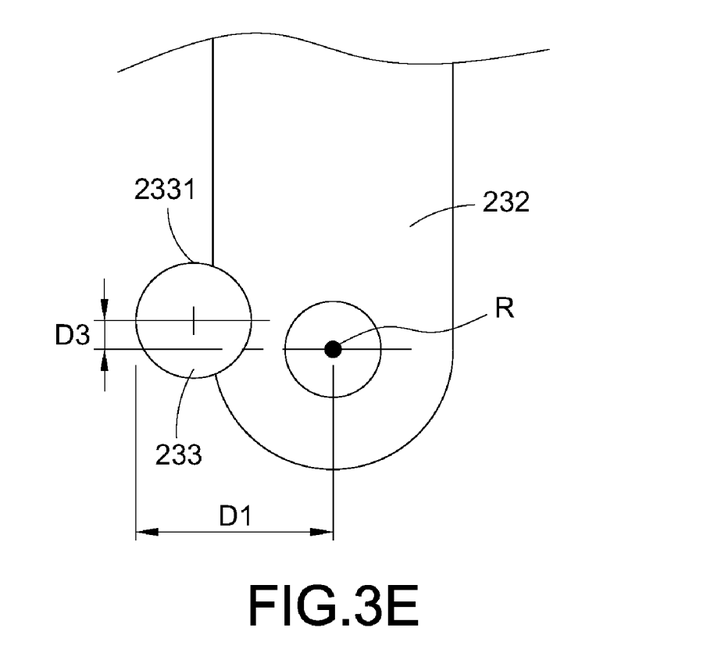
Figure 3F:
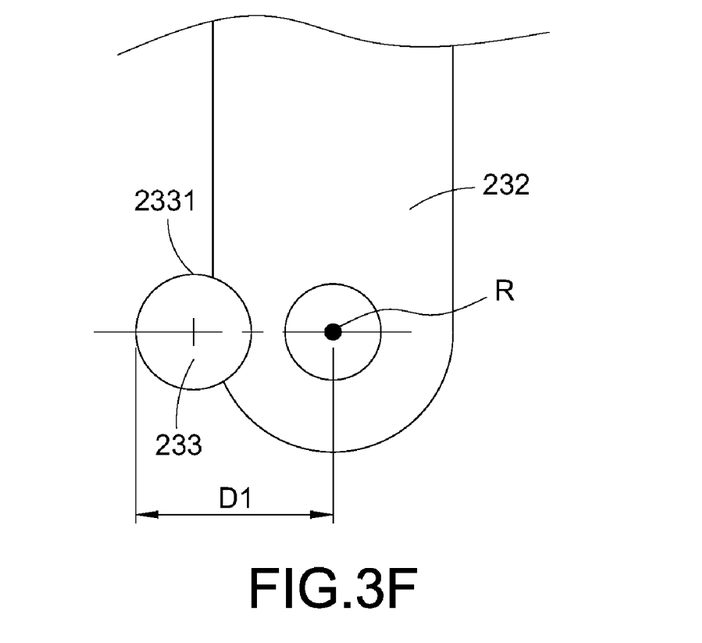

As shown in FIG. 3E, a catching member 233 is disposed adjacent to a pivot axis center R at a side edge of the pivot rod 232 of the handle 23. The catching member 233 assumes a boss shape (it may also be cylindrical or semi-cylindrical), and may or may not be offset from the pivot 2123. An outer circumference of the catching member 233 is defined as a restriction face 2331, and a distance from a farthest point from the pivot axis center R of the restriction face 2331 to the pivot axis center R is D1. If the catching member 233 is offset from the pivot axis center R by an amount D3 (i.e., D3>0), no stopping block 2122 is required to resist the unexpected external force as applied in FIGS. 1, 3A, and 3B. As shown in FIG. 3F, if the catching member 233 is not offset from the pivot axis center R by the amount D3 (i.e., D3=0), a stopping block 2122 is required to resist the unexpected external force as applied in FIGS. 3C and 3D.

Figure 4A:
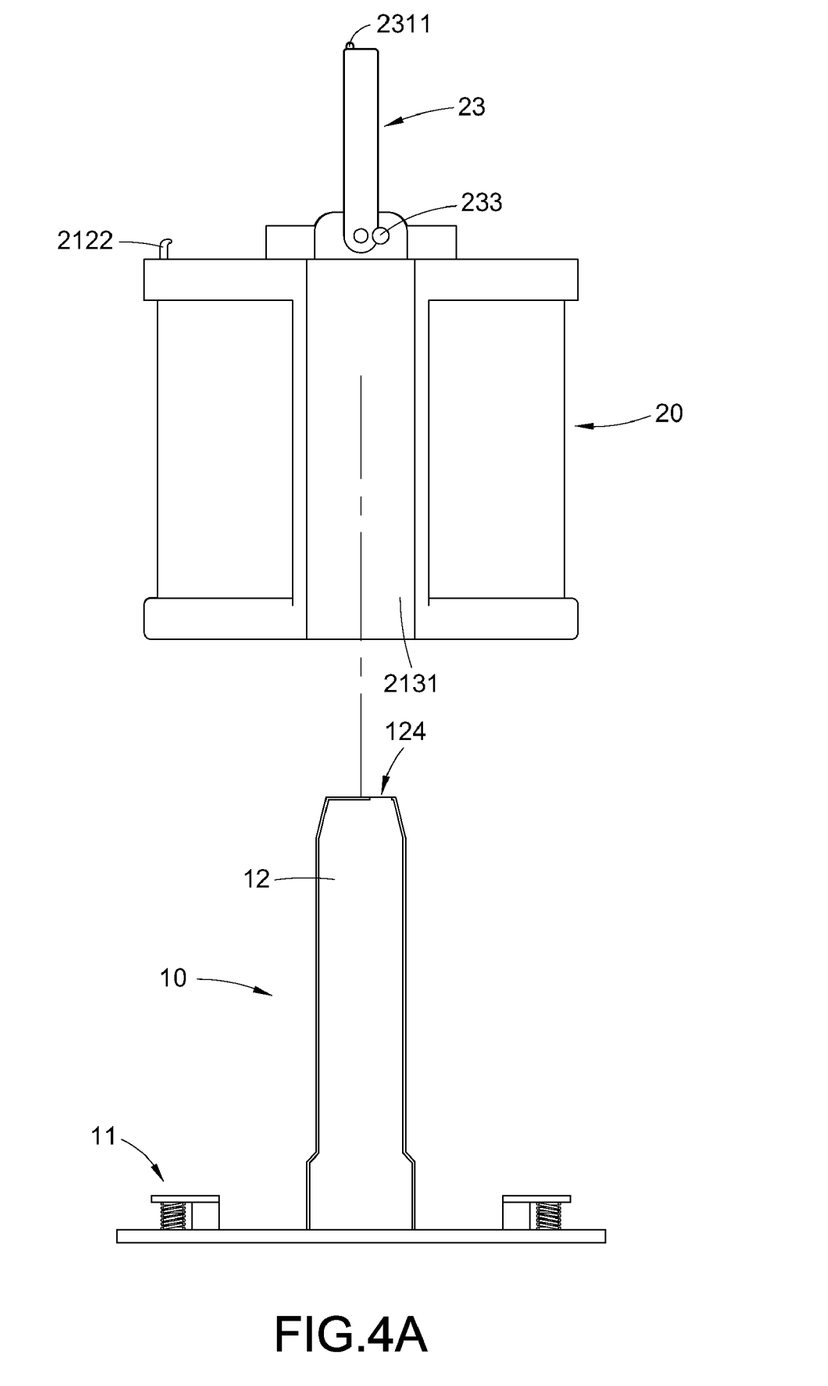
FIGS. 4A to 4D are schematic views of combination actions of the battery module and the base according to the first embodiment of the present invention.
Figure 4B:
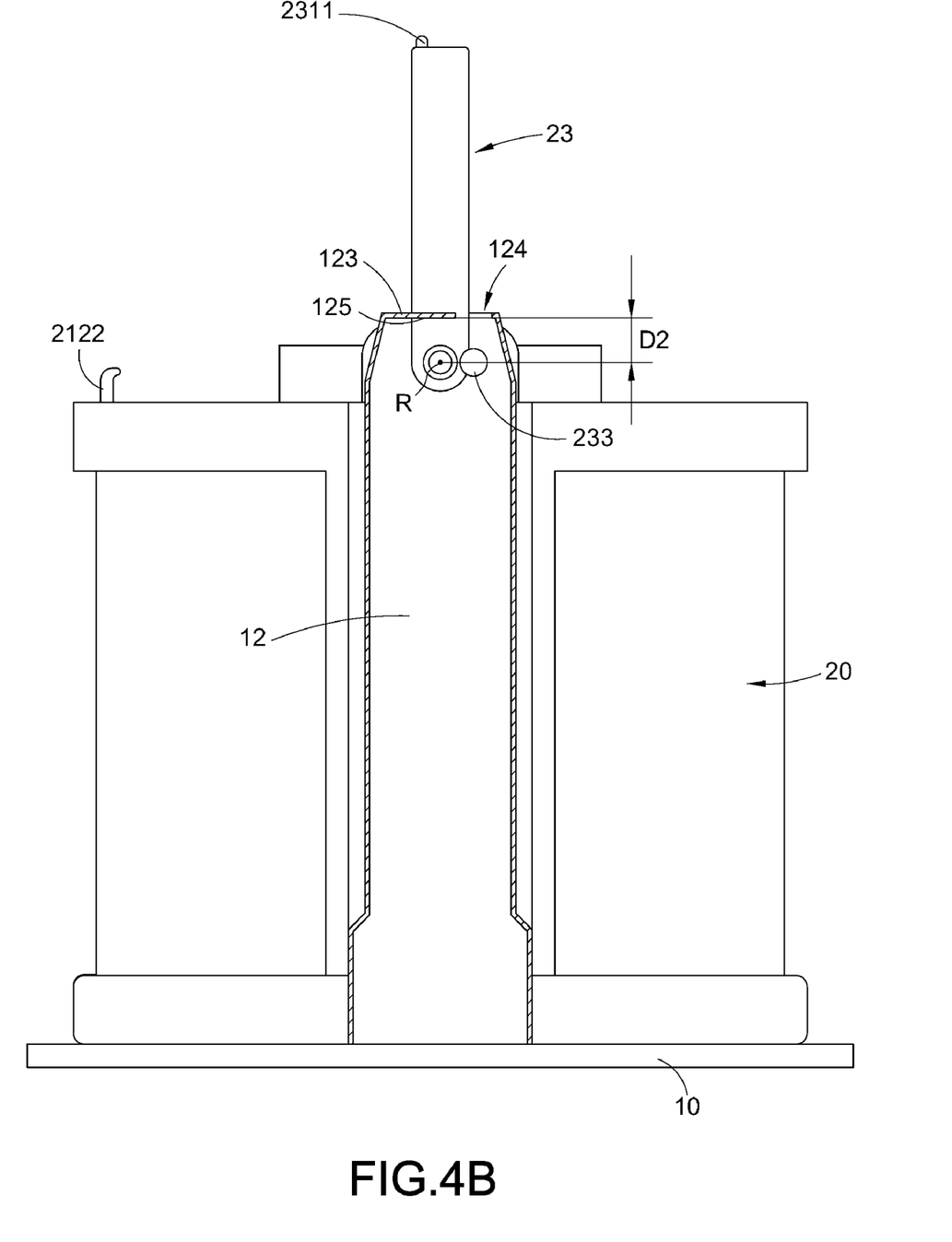

Referring to FIGS. 4A to 4D together, according to the rapid exchange battery construction disclosed by the present invention, to install the battery module 20 in the battery reception space of the electric mobile and fix it on the base 10, the handle 23 should be first rotated to the gripping position for lifting the battery module 20, and the guiding slots 2131 of the battery module 20 are aligned with the fixing structures 12 (as shown in FIG. 4A). The top edge of the fixing structures 12 assume a convergent shape, the guiding slots 2131 of the battery module 20 may be easily fitted into the fixing structures 12, and then, the battery module 20 slides to be close to the base 10 along the fixing structure 12. The catching member 233 on the handle 23 is aligned with the releasing opening 124 of the fixing structure 12, and therefore, the catching member 233 may pass through the releasing opening 124 of the fixing structure 12, such that the battery module 20 is disposed completely above the base 10. The fixing structure 12 provides guiding and positioning functions, and the electrodes 22 of the battery module 20 form an electrical connection with the electrode terminals 11 of the base 10 (as shown in FIG. 4B). In such a position, the battery module 20 is constrained by the fixing structure 12 and cannot move in a horizontal direction. The distance from the pivot axis center R to the pressing portion 125 in such a position is D2, which is smaller than the distance D1 from the farthest point to the pivot axis center R of the restriction face 2331 to the pivot axis center R.

Figure 4C:
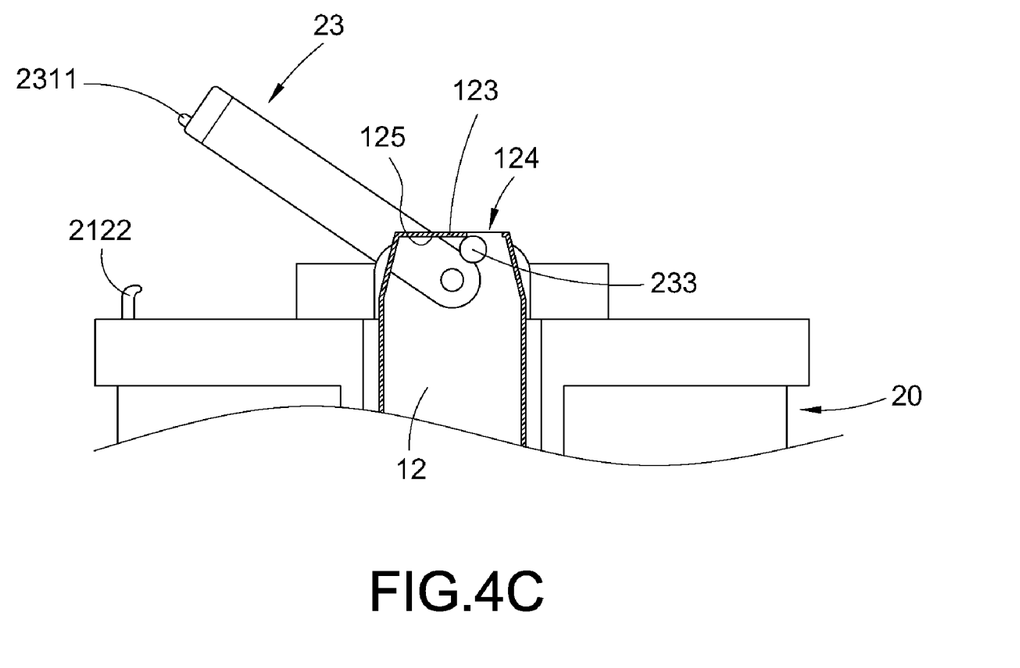
Figure 4D:
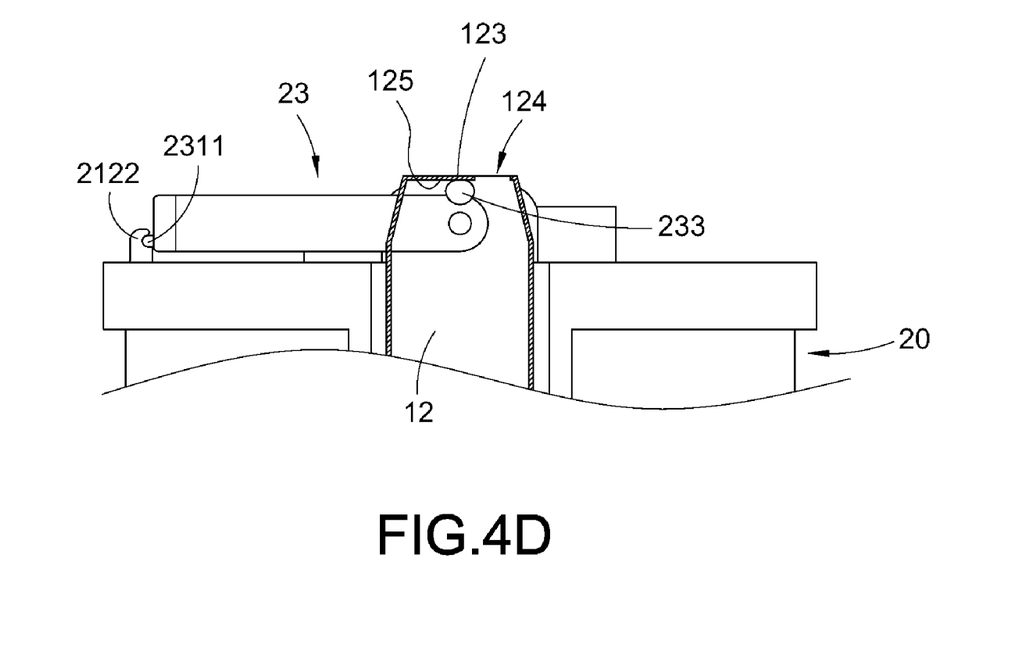

To fix the battery module 20 at the base 10 and make it unable to escape, the handle is then rotated towards the withdrawal position, and since D2<D1, the catching member 233 forms an interference with the top wall 123 (as shown in FIG. 4C). The restriction face 2331 of the catching member 233 is an arc face. As a force is applied on the handle 23 to rotate it to the withdrawal position, the catching member 233 slides to the pressing portion 125, and the catching member 233 forms an interference constraint with the pressing portion 125, such that the battery module 20 is constrained and cannot move in a vertical direction. The clamping blocks 2311 of the handle 23 are engaged by the stopping blocks 2122 to be fixed on the top face 212, so the battery module 20 is fixed on the base 10 and cannot escape (as shown in FIG. 4D). To separate the battery module 20 from the base 10, the handle 23 is moved from the withdrawal position to the gripping position, the catching member 233 on the handle 23 is aligned with the releasing opening 124 of the fixing structure 12, so the catching member 233 may pass through the releasing opening 124 of the fixing structure 12, such that the battery module 20 may be taken out from the base 10.

According to the battery assembly structure disclosed by the present invention, it is through a design of D2<D1 that an interference constraint is formed between the catching member 233 and the pressing portion 125, and the battery module 20 is pushed downwards. That is to say, when the battery module 20 is disposed on the base 10, the electrodes 22 of the battery module 20 form an electrical connection with the electrode terminals 11 of the base 10, the elastic element 112 under the electrode terminal 11 is compressed, and the catching member 233 further presses the battery module 20 downwards against the pressing portion 125. A top-down clamping is formed between the electrodes 22 of the battery module 20 and the electrode terminals 11 of the base 10, so as to ensure a tight contact between the electrodes 22 of the battery module 20 and the electrode terminals 11 of the base 10. The electrical connection between the electrodes 22 of the battery module 20 and the electrode terminals 11 of the base 10 may be maintained even when the electric mobile is in travel.

Thus, according to the rapid exchange battery construction disclosed by the present invention, the handle 23 may aid in lifting and moving the battery, and may provide a tight combination as the handle 23 is withdrawn. A single rotation action of the handle 23 may be used to accomplish the actions of assembling/disassembling and fixing. And, in the process of replacing and fixing the battery module 20, the fixing and the electrical connection between the battery module 20 and the base 10 are accomplished at the same time. Through a design of interference constraint and elastic pressing, the electrical connection relationship between the electrodes 22 of the battery module 20 and the electrode terminals 11 of the base 10 is ensured.

Figure 5:
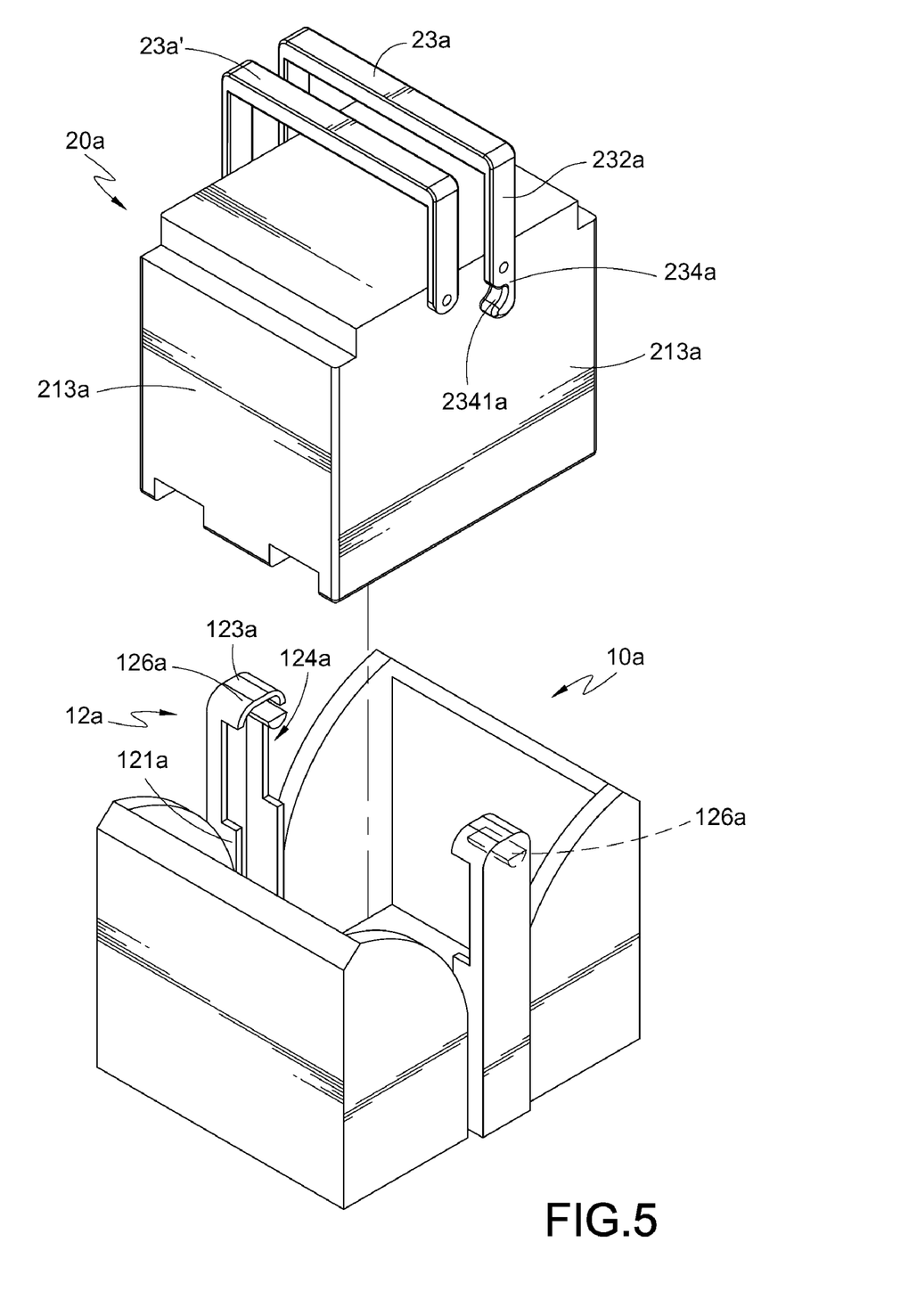
FIG. 5 is an exploded structural view of a second embodiment of the present invention.

Referring to FIG. 5, a rapid exchange battery construction according to a second embodiment of the present invention is shown, in which the battery assembly structure includes a base 10a and a battery module 20a.

The base 10a is substantially the same as the base 10 of the first embodiment, except that the base 10a is a cabinet for directly placing the battery module 20a therein. The base 10a also has two fixing structures 12a, and a releasing opening 124a of the two fixing structures 12a is disposed between a top edge of a side wall 121a and a top wall 123a, i.e., at a side edge of the fixing structure 12a. An engaging block 126a is disposed on an inner face of the fixing structure 12a, and the engaging block 126a assumes a semi-circular body with the arc face downwards.

The battery module 20a is substantially the same as the battery module 20 of the first embodiment, except that the battery module 20a may be directly placed into the base 10a, i.e., the guiding slot 2131 of the first embodiment should not be disposed. Also, the battery module 20a of the second embodiment is pivoted with two handles 23a, 23a', which are spaced apart by a distance and pivoted to the side face 213a. The pivot rod 232a of the handle 23a (the handle 23a' is the same as the handle 23a) has a hook portion 234a extending from the pivot axis center R. A matched engaging block 126a and a clamping slot 2341a assuming a semi-circular shape is disposed at the hook portion 234a.

Figure 6A:
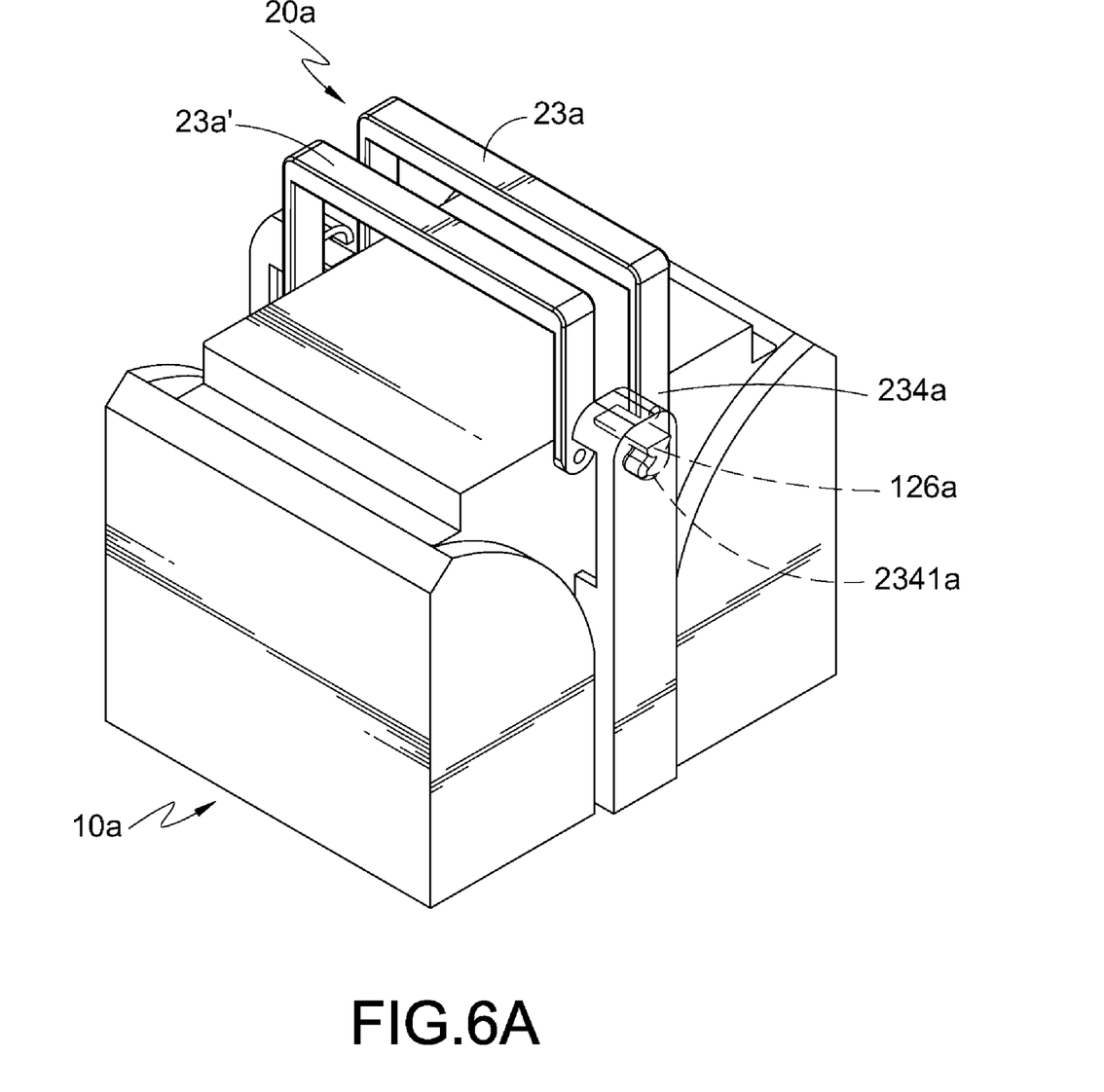
FIGS. 6A to 6B are schematic views of combination actions of the battery module and the base according to the second embodiment of the present invention.
Figure 6B:
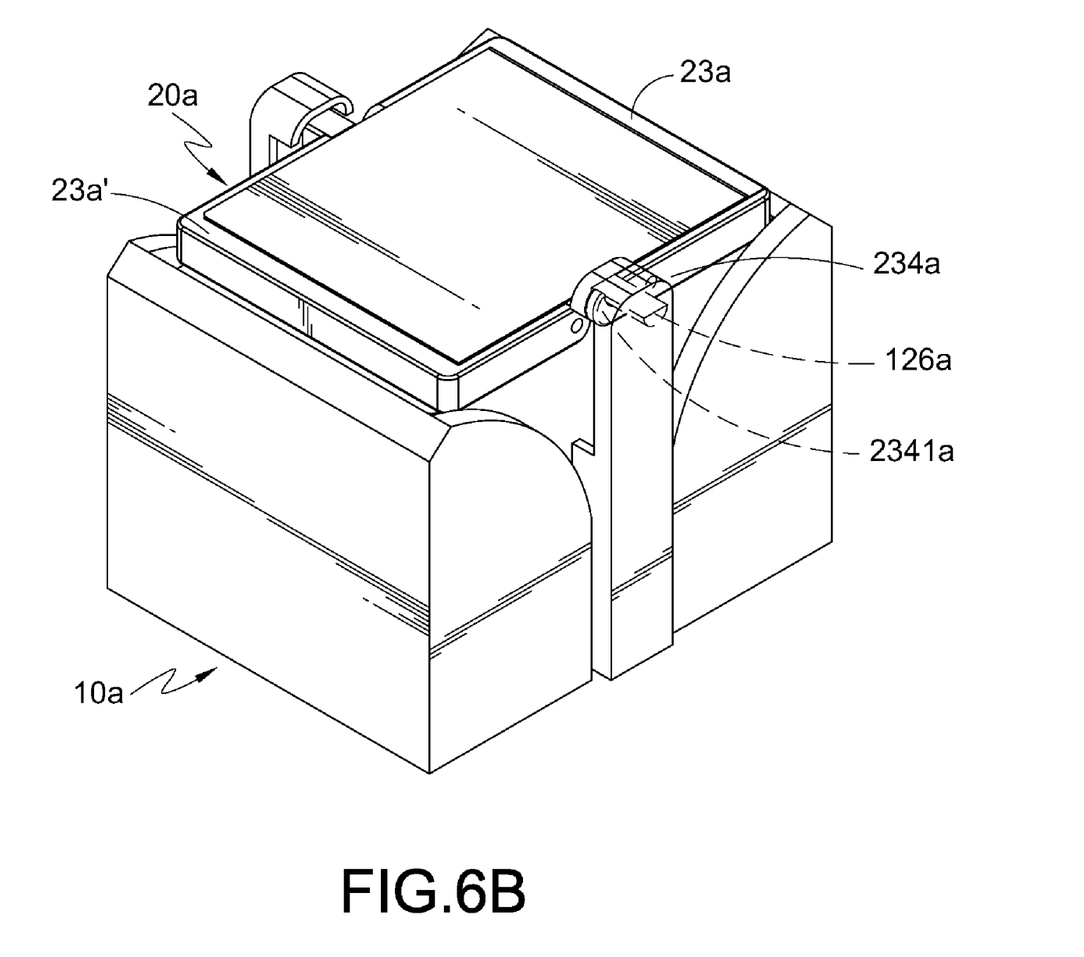

Referring to FIGS. 6A to 6B together, according to the second embodiment of the rapid exchange battery construction disclosed by the present invention, the handles 23a, 23a' are similarly rotated to the gripping position and the withdrawal position, and the hook portion 234a of the pivot rod 232a passes through the releasing opening 124a, such that the clamping slot 2341a of the pivot rod 232a forms an interference constraint with the engaging block 126a, and therefore, the battery module 20a is constrained and cannot move in the vertical direction. The clamping slot 2341a of the handle 23a is engaged with the snapping block 126a, such that the battery module 20a is fixed on the base 10a and cannot escape. On the contrary, as the handle 23a is moved from the withdrawal position to the gripping position, the battery module 20a may be taken out from the base 10a.

What is claimed is:
1. A rapid exchange battery construction, comprising:
a battery housing, for constituting a battery module for supplying power, the battery module being disposed with a plurality of electrodes, and the battery housing being combined to at least one fixing structure in a base; and
a handle, pivoted to the battery housing via a pivot, the handle being rotatable to a gripping position and a withdrawal position, and a catching member offset from a pivot axis center of the pivot being disposed on the handle;
wherein the handle is at the gripping position to lift and place the battery module on the base, a plurality of electrode terminals is provided on the base, the at least one fixing structure is disposed with a pressing portion, the handle is rotated to the withdrawal position, such that the catching member is rotated to the pressing portion of the at least one fixing structure, so as to fix the battery module on the base, and achieve an electrical connection between the electrode of the battery module and the electrode terminal of the base.

2. The rapid exchange battery construction according to claim 1, wherein the battery module is disposed with at least one guiding slot matching the at least one fixing structure.

3. The rapid exchange battery construction according to claim 2, wherein the at least one fixing structure comprises first and second fixing structures, the at least one guiding slot comprises first and second guiding slots located at two ends of the battery module and are placed into the first and second fixing structures at two ends of the base, respectively.

4. The rapid exchange battery construction according to claim 1, wherein the at least one fixing structure on the base further comprises a releasing opening, and as the battery module is placed to or separated from the base, the catching member passes through the releasing opening, such that the battery housing is rapidly assembled to or separated from the base.

5. The rapid exchange battery construction according to claim 1, wherein the catching member assumes a boss shape and has a restriction face, and as the handle is located at the withdrawal position, the restriction face forms an interference constraint with the pressing portion.

6. The rapid exchange battery construction according to claim 1, wherein the electrode on the base comprises a conducting strip and an elastic element disposed under the conducting strip.

7. A rapid exchange battery construction, comprising:
a battery housing, for constituting a battery module for supplying power, the battery module being disposed with a plurality of electrodes, and the battery housing being combined to a pair of fixing structures spaced apart by a distance in a base; and
a handle, pivoted to the battery housing via a pivot, the handle being rotatable to a gripping position and a withdrawal position, and a catching member being disposed on the handle;
wherein the handle is at the gripping position to lift and place the battery module on the base, a plurality of electrode terminals is provided on the base, each of the fixing structures is disposed with a pressing portion, the handle is rotated to the withdrawal position, such that the catching member is rotated to the pressing portion of each of the fixing structures, so as to fix the battery module on the base, and achieve an electrical connection between the electrode of the battery module and the electrode terminal of the base.

8. The rapid exchange battery construction according to claim 7, wherein the battery module is disposed with a pair of guiding slots matching the pair of fixing structures, respectively.

9. The rapid exchange battery construction according to claim 8, wherein the pair of guiding slots at the two ends of the battery module are placed into the pair of fixing structures on the two ends of the base, respectively.

10. The rapid exchange battery construction according to claim 7, wherein each of the fixing structures of the pair of fixing structures on the base further comprises a releasing opening, and as the battery module is placed to or separated from the base, the catching member passes through the releasing opening, such that the battery housing is rapidly assembled to or separated from the base.

11. The rapid exchange battery construction according to claim 7, wherein the handle is disposed with a clamping block, a top face of the battery module is disposed with a stopping block, and as the handle is at the withdrawal position, the stopping block is engaged with the clamping block.

12. The rapid exchange battery construction according to claim 7, wherein the catching member assumes a boss shape and has a restriction face, and as the handle is located at the withdrawal position, the restriction face forms an interference constraint with the pressing portion.

13. The rapid exchange battery construction according to claim 7, wherein a center of the catching member on the handle does not offset from a center of the pivot of the handle.

* * * * *